US010555039B1

(12) United States Patent
Kline et al.

(10) Patent No.: US 10,555,039 B1
(45) Date of Patent: Feb. 4, 2020

(54) CONTENT FILTERING BASED ON NIGHTMARE PATTERN

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/044,541

(22) Filed: Jul. 25, 2018

(51) Int. Cl.
*H04N 21/40* (2011.01)
*H04N 21/442* (2011.01)
*G06F 3/01* (2006.01)
*H04L 29/08* (2006.01)
*G06F 16/435* (2019.01)

(52) U.S. Cl.
CPC ....... *H04N 21/44218* (2013.01); *G06F 3/015* (2013.01); *G06F 16/436* (2019.01); *G06F 16/437* (2019.01); *H04L 29/08675* (2013.01); *H04N 21/40* (2013.01)

(58) Field of Classification Search
CPC .................................................. H04N 21/40
See application file for complete search history.

(56) References Cited

U.S. PATENT DOCUMENTS

| 8,762,312 B1 | 6/2014 | Newstadt et al. |
| 2009/0177327 A1 | 7/2009 | Turner et al. |
| 2012/0209907 A1 | 8/2012 | Andrews et al. |
| 2015/0290453 A1 | 10/2015 | Tyler et al. |
| 2017/0304583 A1 | 10/2017 | Shambroom et al. |

(Continued)

FOREIGN PATENT DOCUMENTS

WO    2017212333 A1    12/2017

OTHER PUBLICATIONS

Mel, Peter "The MIST Definition of Cloud Computing Recommendations of the National Institute of Standards and Technology", Special Publication 800-145; Sep. 2011; U.S. Dept of Commerce; 7 pgs.

(Continued)

*Primary Examiner* — Michael H Hong
(74) *Attorney, Agent, or Firm* — Cantor Colburn LLP; Tihon Poltavets

(57) ABSTRACT

Methods, systems and computer program products for filtering media content to prevent sleep disturbances are provided. Aspects include receiving from a first user a request for a content item and obtaining a user profile for the first user and a description of the content item. Aspects also include comparing the user profile to the description of the content item to identify characteristics of the content item that will be disturbing to the first user and determining, based on the comparison, whether the content item will cause the first user to have a sleep disturbance. Based on determining that the content item will not cause the first user to have the sleep disturbance, aspects include playing the content item. Based on determining that the content item will cause the first user to have the sleep disturbance, aspects include preventing the content item from being played.

20 Claims, 6 Drawing Sheets

(56) References Cited

U.S. PATENT DOCUMENTS

2018/0279946 A1\* 10/2018 Nachman ............ A61B 5/4815

OTHER PUBLICATIONS

Allison, Conor "Best sleep trackers: We compare Fitbit, wearable and bedside devices" https://www.wareable.com/health-and-wellbeing/best-sleep-trackers-and-monitors; Jun. 4, 2019; 14 pgs.
Norton, Amy "Violent Media Often Give Rise to Nightmares", HealthDay; https://consumer.healthday.com/sleep-disorder-information-33/misc-sleep-problems-news-626/violent-media-often-give-rise-to-nightmares-717021.html; Nov. 22, 2016; 5 pgs.
Taylor, Ashley P. "Why You Probably Shouldn't Watch the Walking Dead Before Bed", http://www.menshealth.com/health/watching-violent-tv-before-bed-gives-nightmares; dated Dec. 23, 2016; 6 pgs.
WebMD "How Much Sleep Do Children Need?", https://www.webmd.com/parenting/guide/sleep-children?print=true; 2018; KidsHealth.org; 2 pgs.

\* cited by examiner

CONTENT FILTERING BASED ON NIGHTMARE PATTERN

BACKGROUND

The invention relates generally to content filtering and, more specifically, to filtering media content to prevent sleep disturbances, such as nightmares.

People generally experience or interacted with various content throughout the day, which includes television content, story books, Web content, social media, games, etc. People often experience sleep disturbances as a result of the content that they are exposed to during the day. As a result of sleep disturbances, many people become fearful or anxious of nighttime which in turn impacts their sleep. Since different people react differently to various content items, filtering the content items to prevent sleep disturbances is a difficult task.

SUMMARY

According to an embodiment, a system for filtering media content to prevent sleep disturbances is provided. The system includes a memory having computer readable computer instructions, and a processor for executing the computer readable instructions. The computer readable instructions include instructions for receiving from a first user a request for a content item and obtaining a user profile for the first user and a description of the content item. The computer readable instructions also include instructions for comparing the user profile to the description of the content item to identify characteristics of the content item that will be disturbing to the first user and determining, based on the comparison, whether the content item will cause the first user to have a sleep disturbance. Based on determining that the content item will not cause the first user to have the sleep disturbance, the computer readable instructions include instructions for playing the content item. Based on determining that the content item will cause the first user to have the sleep disturbance, the computer readable instructions include instructions for preventing the content item from being played.

According to another embodiment, a method for filtering media content to prevent sleep disturbances is provided. The method includes receiving from a first user a request for a content item and obtaining a user profile for the first user and a description of the content item. The method also includes comparing the user profile to the description of the content item to identify characteristics of the content item that will be disturbing to the first user and determining, based on the comparison, whether the content item will cause the first user to have a sleep disturbance. Based on determining that the content item will not cause the first user to have the sleep disturbance, the method includes playing the content item. Based on determining that the content item will cause the first user to have the sleep disturbance, the method includes preventing the content item from being played.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes receiving from a first user a request for a content item and obtaining a user profile for the first user and a description of the content item. The method also includes comparing the user profile to the description of the content item to identify characteristics of the content item that will be disturbing to the first user and determining, based on the comparison, whether the content item will cause the first user to have a sleep disturbance. Based on determining that the content item will not cause the first user to have the sleep disturbance, the method includes playing the content item. Based on determining that the content item will cause the first user to have the sleep disturbance, the method includes preventing the content item from being played.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
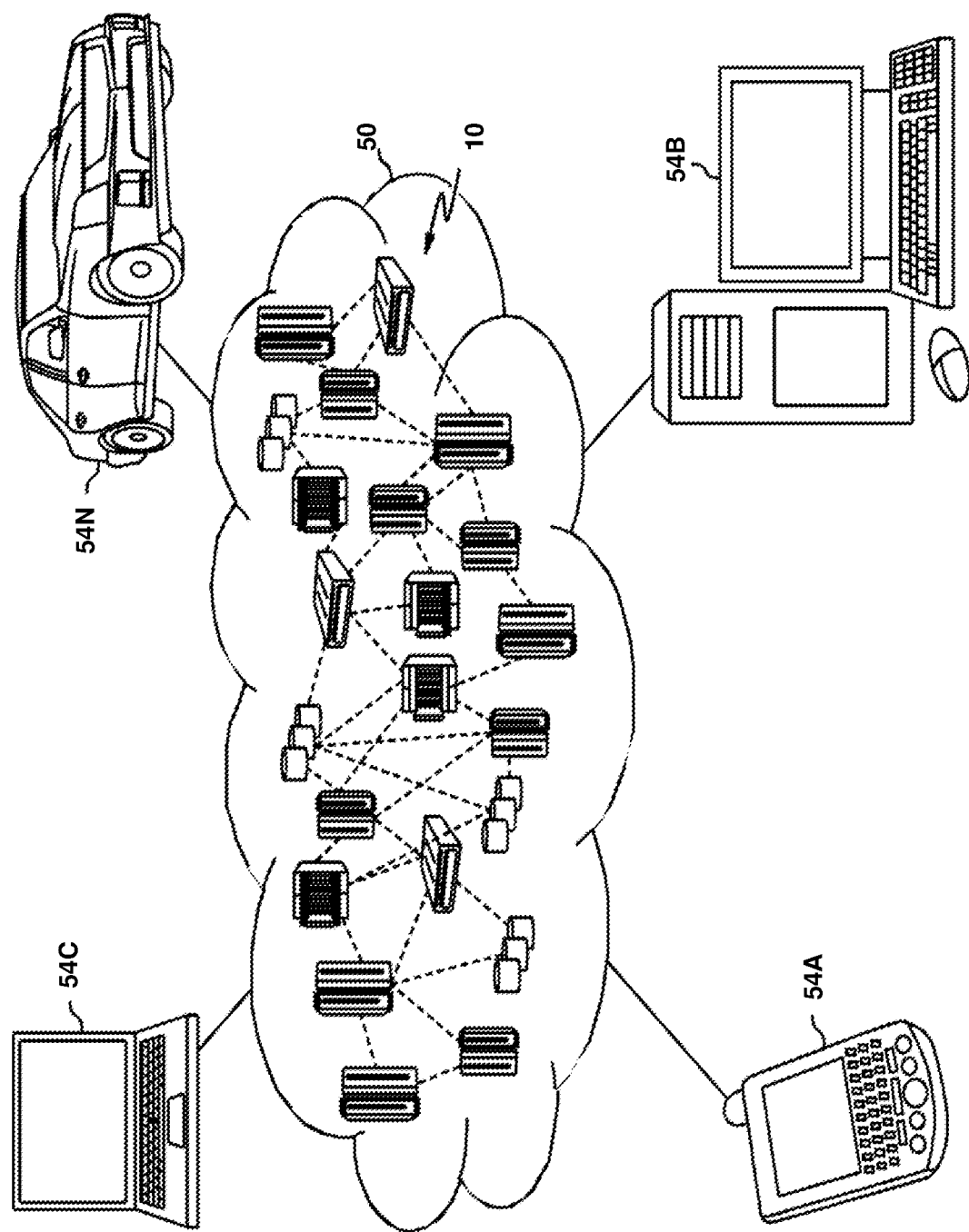
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
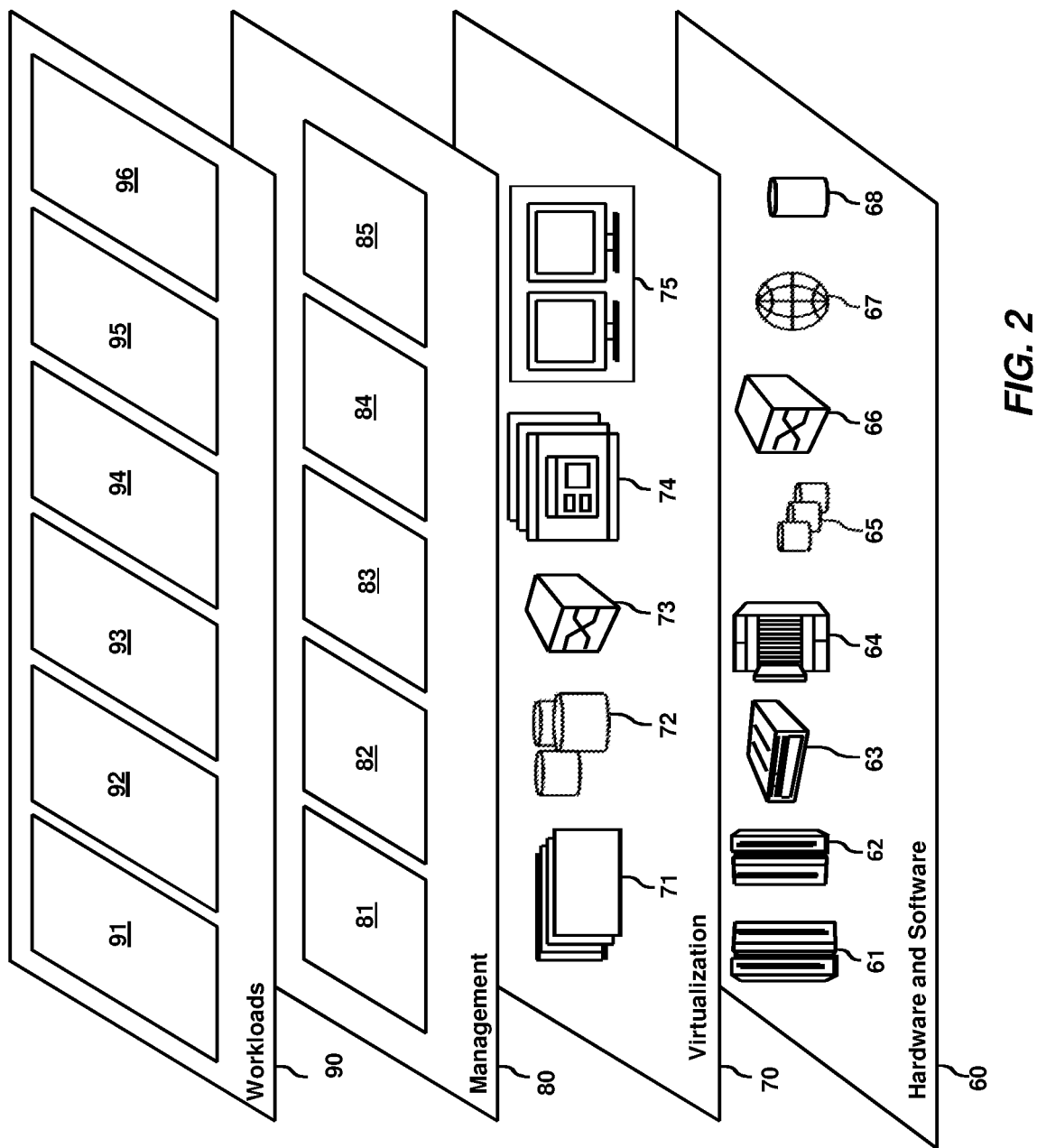
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and filtering media content to prevent sleep disturbances 96.

Figure 3:
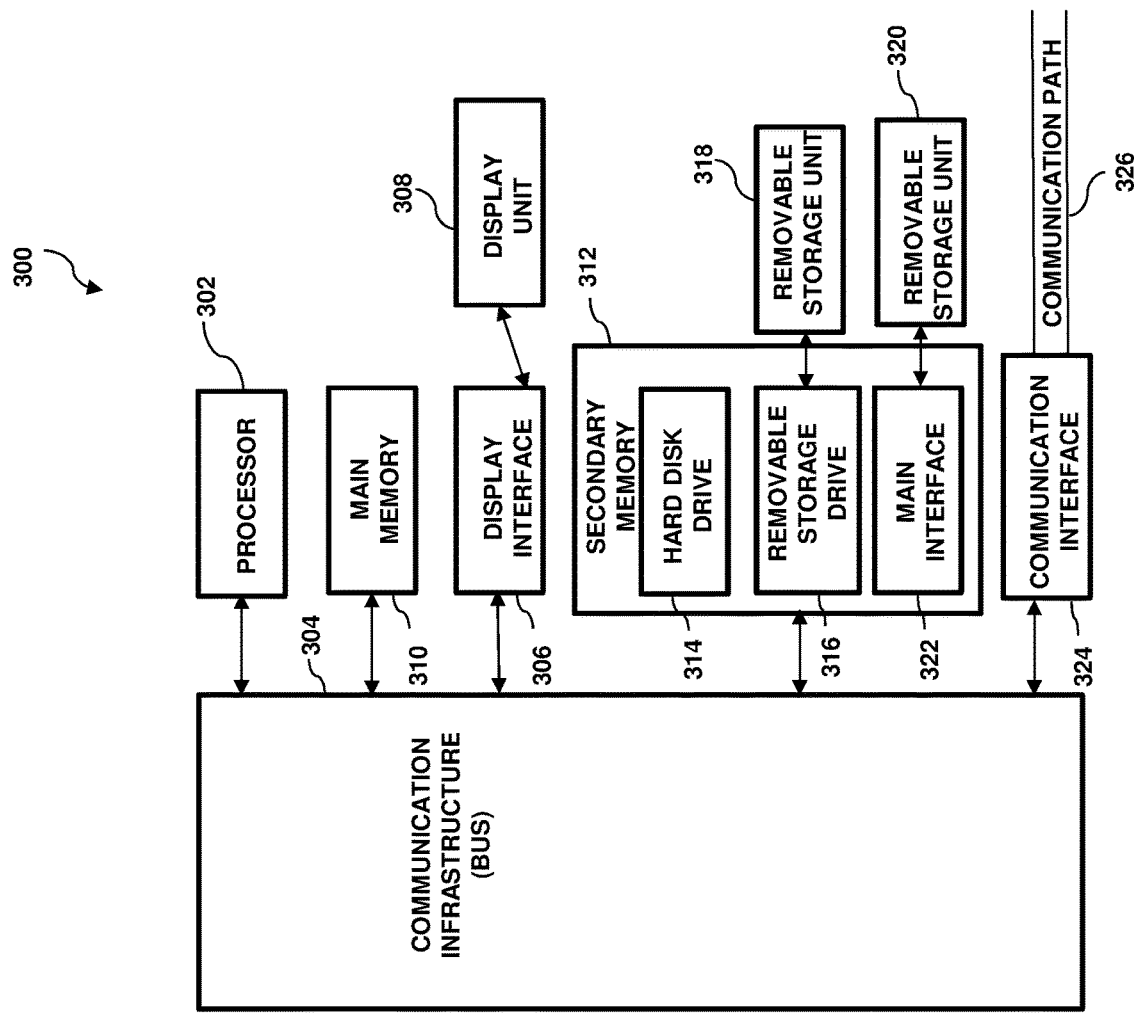
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for filtering media content to prevent sleep disturbances is provided. In exemplary embodiments, a user profile for each user is created and used to filter the content that is provided to the user. The user profile is created by monitoring users as they consume content and storing detected changes in the user along with their correspondence with to the consumed content. User profiles are updated based on detected changes to the sleep patterns of the user after the user consumes content items. In exemplary embodiments, various devices are used to monitor a heart rate, a blood pressure, a respiratory rate, etc. of the user both during the consumption of content items and while the user is sleeping. In various embodiments, when a user requests a content item, the system compares a description of the requested content to the user profile to determine whether the requested content is likely to cause the user to have sleep disturbance. If requested content is likely to cause the user to have sleep disturbance the system can block access to the content item and can optionally provide a modified version of the content item.

Figure 4:
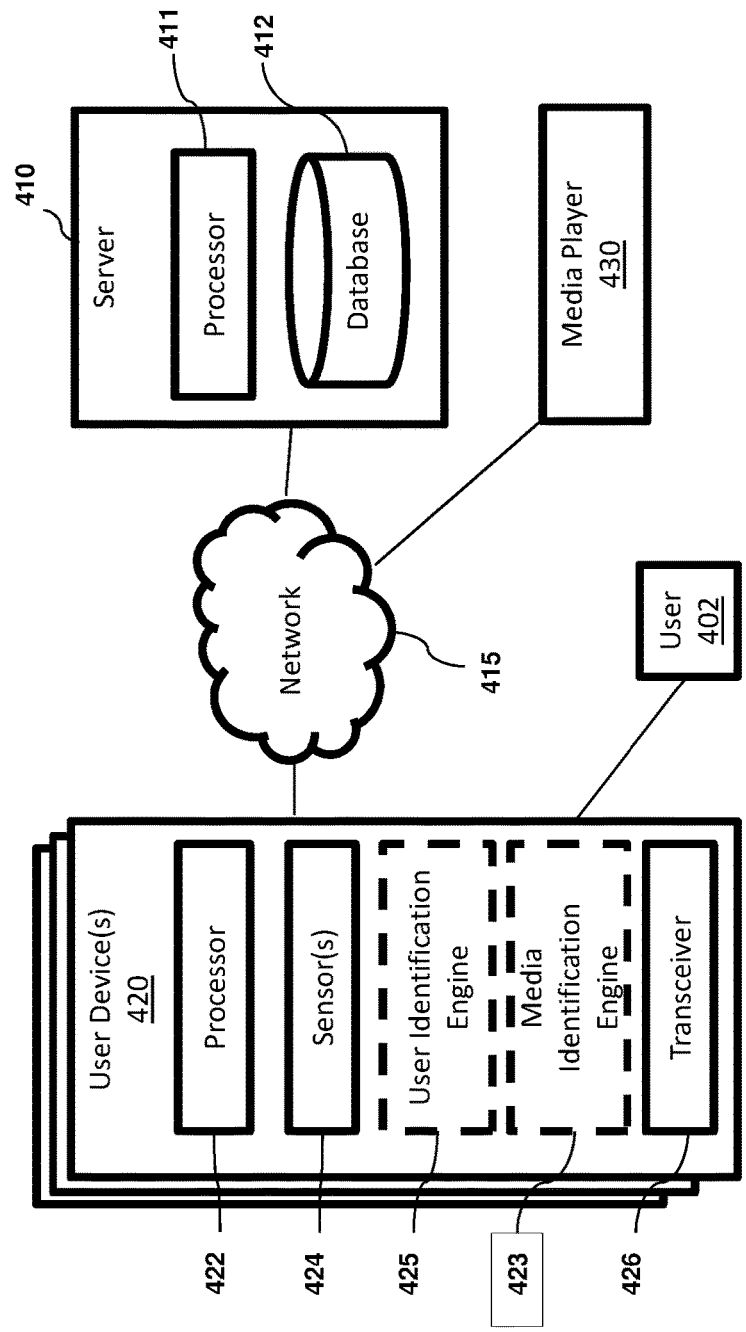
FIG. 4 depicts a system upon which filtering media content to prevent sleep disturbances 1 may be implemented according to one or more embodiments of the present invention.

Turning now to FIG. 4, a system 400 for filtering media content to prevent sleep disturbances will now be described in accordance with an embodiment. The system 400 includes a server 410 in communication with user devices 420 and a media player 430 via a communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The user devices 420 are configured to monitor the user 402 as the user consumes, e.g., watches or listens to, media content items and/or as the user sleeps.

In exemplary embodiments, the user devices 420 can include, but are not limited to, a smartphone, a wearable device such as a smartwatch, a tablet, a computer system such as the one shown in FIG. 3, a smart speaker, a television, or any other suitable electronic device. The user device 420 includes a processor 422, one or more sensors 424 and a transceiver 426. The sensors 424 are used to observe users 402 as they consume media content from the media player 430 or from another source. The sensors 424 can monitor the blood pressure, the heart rate, the respiratory rate, and other physical characteristics of the user 402 as the user 402 consumes content items and/or as the user 402 sleeps. The processor 422 receives data from the one or more sensors 424 and detects a change in the state of a user 402. A change in the state of the user can be indicated by an increase in blood pressure, heart rate and/or respiratory rate above a threshold amount. In exemplary embodiments, the sensors 424 can also monitor other physical characteristics of the user 402 and can determine if the user 402 is crying, shivering, shaking, or the like.

In one embodiment, the first user device 420 can also include a media identification engine 423 that is configured to identify content that is being consumed by the user 402.

In one embodiment, the content includes content provided by a media player 430, which can include a television, a computer, a tablet, a smart speaker, a smartphone, or the like. The media identification engine 423 can receive data regarding the content being played by the media player 430 either from the media player 430 directly or via the network 415. In another embodiment, the content includes content provided by another user, i.e., a parent or teacher reading a child a story or a book. In one embodiment, the media identification engine 423 captures a sample of a content item being consumed by the user and transmits that sample to the server 410 which uses various known techniques to identify the content item.

In one embodiment, the user device 420 can also include a user identification engine 425. The user identification engine 425 can include a facial recognition engine that is configured to compare received image of a user to stored images in a local database. For example, if the user device 420 is a television with a camera, the user device 420 may include a user identification engine 425 to determine which user(s) are watching a content item being played by the television. In other embodiments, the user device 420 can be associated with a particular user. For example, if the user device 420 is a smart watch, the smart watch has a stored association with the user 402 wearing the smart watch.

In exemplary embodiments, machine learning can be used to create the user profiles that are stored in the database 412. The user profiles include stored associations between detected changes in a state of a user while consuming a content item and an associated characteristic of the content item. For example, if a user experiences an increase in heart rate during a part of a content item that has gory violence that detected change and an indication that it was associated with gory violence stored in the user profile. In addition, the user profiles include stored associations between detected changes in a sleeping state of a user during a time period after consuming a content item and the detected change in the state of the user. Continuing with the above example, if the user experiences a disturbance while sleeping that is similar to earlier the detected change, the user profile is updated to indicate that the content item caused the user to have a sleep disturbance.

In exemplary embodiments, upon a media player 430 receiving a request from a user 402 to play a content item, the media player 430 communicates with the server 410 to determine whether to play the requested content item based on a user profile for the user 402 stored in the database. The processor 411 compares a description of the requested content to the user profile and determines whether the requested content is likely to cause the user 402 to have sleep disturbance. If requested content is likely to cause the user 402 to have sleep disturbance the server can block access to the content item and can optionally provide a modified version of the content item via the media player 430. In exemplary embodiments, the server 411 can be embodied as a computer system such as the one shown in FIG. 3 or in a cloud computing environment such as the one shown in FIGS. 1 and 2.

Figure 5:
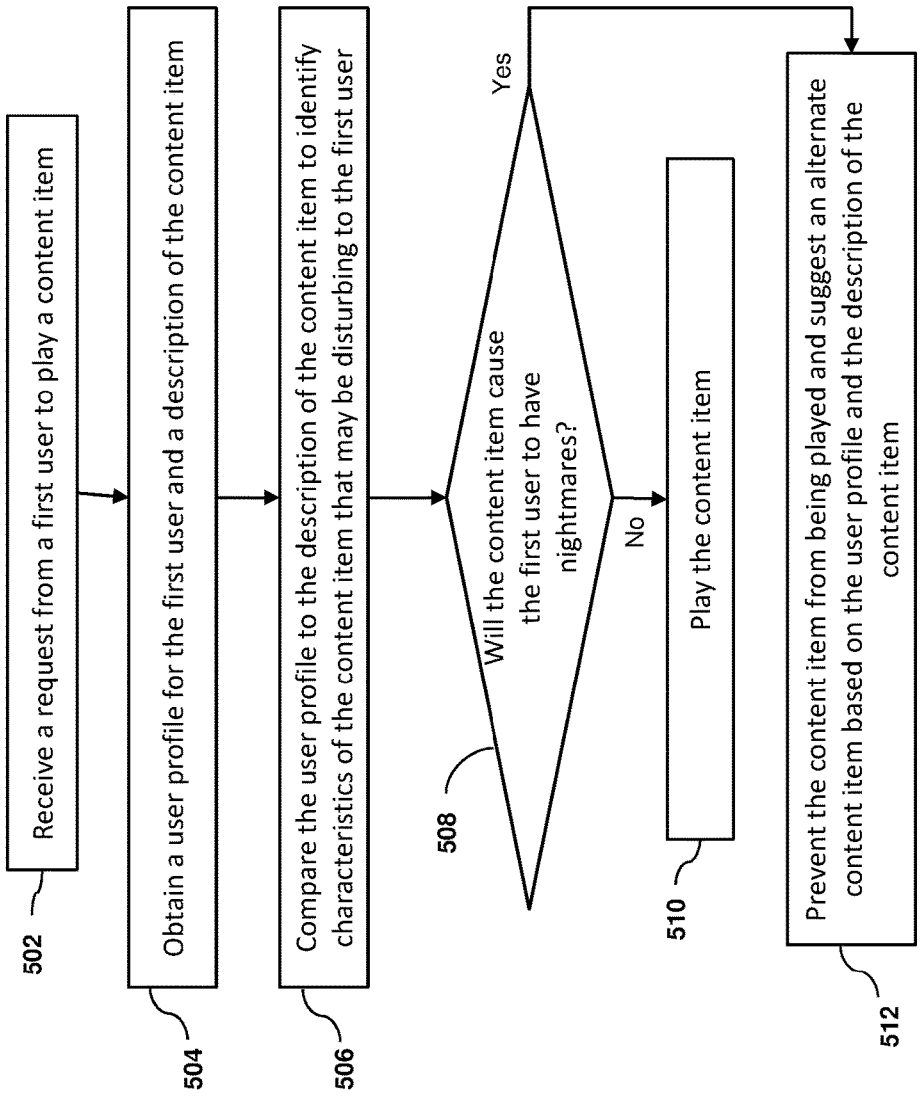
FIG. 5 depicts a flow diagram of a method for filtering media content to prevent sleep disturbances according to one or more embodiments of the present invention.

Turning now to FIG. 5, a flow diagram of a method 500 for filtering media content to prevent sleep disturbances in accordance with an embodiment is shown. The method 500 begins at block 502 and includes receiving a request from a first user to play a content item. Next, as shown at block 506, the method 500 includes obtaining a user profile for the first user and a description of the content item. In exemplary embodiments, the user profile can be created by the method shown in FIG. 6.

In one embodiment, if a user profile is not available, or has not yet been created, for the user, a composite user profile is used. The composite user profile is a user profile based on combining the user profiles of a plurality of users that have demographic information similar to the user. For example, if a user profile does not exist, the user is asked to provide their age, gender and/or location and a composite user profile can be created by combining the user profiles of a plurality of users that have are within a threshold age. In this embodiment, the sleep disturbance based content filtering will be based on the user's age, current health condition, gender, location, etc.

Continuing with reference to FIG. 5, as shown at block 506, the method 500 includes comparing the user profile to the description of the content item to identify characteristics of the content item that may be disturbing to the first user. In one embodiment, the comparison includes determining if any of the characteristics of the content item provided in the description correspond with characteristics of a previously watched content item that caused a change in a state of the user while watching the previous content, based on data stored in the user profile. For example, if the user previously watched a movie in which the death of a parent was depicted and it caused the user to become upset, if the description indicates that the content item depicts the death of a parent it will be flagged as potentially disturbing. Next, as shown at decision block 508, the method 500 includes determining if the content item cause the first user to have a sleep disturbance. In one embodiment, this determination is made by determining if previously viewed content with similar characteristics caused the first user to have a sleep disturbance, based on data stored in the user profile. If the content item will not cause the first user to have a sleep disturbance, the method 500 includes playing the content item, as shown at block 510. Otherwise, the method 500 includes preventing the content item from being played and suggesting an alternate content item based on the user profile and the description of the content item, as shown at block 512. In exemplary embodiments, the system may play the requested content item in a modified form based on determining that the original content item may cause a sleep disturbance. The modified content item could have portions removed or it can have additional content added to help mitigate the disturbing impact to the first user. For example, the modified content can include the introduction of a super hero character, the addition of scene where a deceased character returns to life, an alternate happier ending, or the like.

Figure 6:
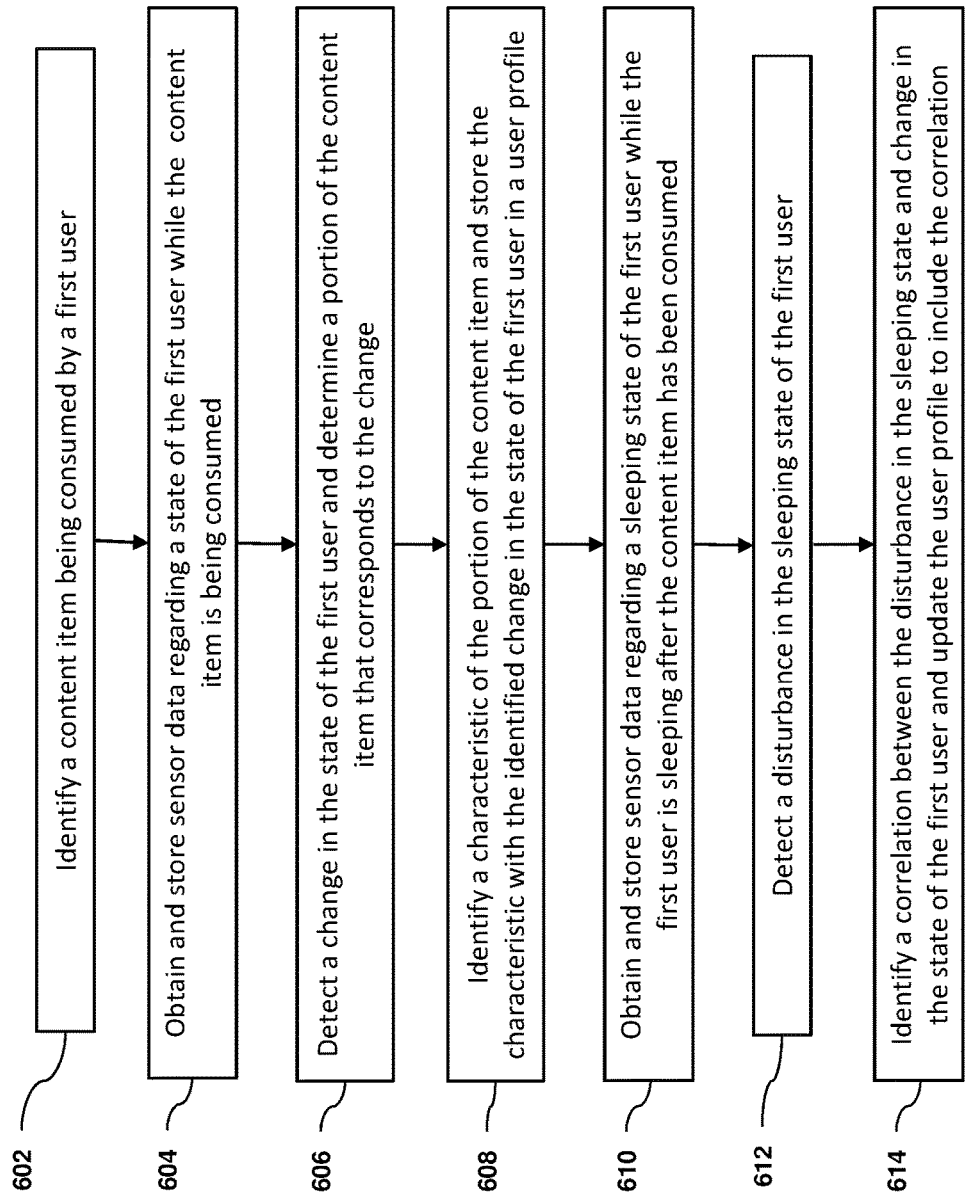
FIG. 6 depicts a flow diagram of a method for monitoring user reaction to consumed content according to one or more embodiments of the present invention.

Turning now to FIG. 6, a flow diagram of a method 600 for monitoring the reaction of a user to consumed content in accordance with an embodiment is shown. As shown at block 602, the method 600 includes identifying a content item being consumed by a first user. Next, as shown at block 604, the method 600 includes obtaining and storing sensor data regarding a state of the first user while the content item is being consumed. The method 600 also includes detecting a change in the state of the first user and determining a portion of the content item that corresponds to the detected change, as shown at block 606.

Next, as shown at block 608, the method 600 includes identifying a characteristic of the portion of the content item and storing the characteristic with the identified change in the state of the first user in a user profile. The characteristic is a description of the portion of the content, i.e., gory violence, depiction of death or loss of parent, depiction of death or loss of pet, depiction of a monster, etc. Next, as shown at block 610, the method 600 includes obtaining and storing sensor data regarding a sleeping state of the first user while the first user is sleeping after the content item has been consumed. The method 600 also includes detecting a disturbance in the sleeping state of the first user, as shown at block 612. As shown at block 614, the method 600 also includes identifying a correlation between the disturbance in the sleeping state and the change in the state of the first user and updating the user profile to include the correlation. This correlation is used to predict whether a given content item will cause the first user to have a sleep disturbance.

Technical benefits include method and system for personalized filtering of content consumed by users to prevent the users from having sleep disturbance. By creating a personal user profile for each user and filtering content based on the user profile, effective filtering of content that is likely to cause an individual to have a sleep disturbance can be performed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for filtering media content to prevent sleep disturbances, comprising:
    receiving from a first user a request for a content item;
    obtaining a user profile for the first user and a description of the content item;
    comparing, by a processor, the user profile to the description of the content item to identify characteristics of the content item that will be disturbing to the first user;
    determining, based on the comparison, whether the content item will cause the first user to have a sleep disturbance;
    based on determining that the content item will not cause the first user to have the sleep disturbance, playing the content item; and
    based on determining that the content item will cause the first user to have the sleep disturbance, preventing the content item from being played.

2. The method of claim 1, further comprising, based on determining that the content item will cause the first user to have the sleep disturbance, playing an alternate content item selected based on the description of the content item.

3. The method of claim 1, further comprising, based on determining that the content item will cause the first user to have the sleep disturbance, playing a modified version of the content item, wherein the modified version of the content item has one or more portions of the content item removed.

4. The method of claim 1, wherein the user profile is created by:
    identifying a consumed content item by the first user;
    obtaining and storing sensor data regarding a state of the first user during consumption of the consumed content item;
    detecting a change in the state of the first user;
    determining a portion of the consumed content item that corresponds to the change;
    identifying a characteristic of the portion of the consumed content item; and
    storing the characteristic and the detected change in the user profile.

5. The method of claim 1, wherein determining whether the content item will cause the first user to have the sleep disturbance includes determining whether the content item includes characteristics that previously caused the first user to have the sleep disturbance.

6. The method of claim 4, wherein detecting the change in the state of the first user includes detecting a change in one or more of a heart rate, a blood pressure, and a respiratory rate of the first user.

7. The method of claim 4, wherein the user profile is updated by:
obtaining and storing sensor data regarding a sleeping state of the first user while the first user is sleeping after consuming the consumed content item;
detecting a disturbance in the sleeping state of the first user;
identifying a correlation between the disturbance in the sleeping state and the change in the state of the first user; and
updating the user profile to include the correlation.

8. The method of claim 7, wherein detecting the change in the sleeping state of the first user includes detecting a change in one or more of a heart rate, a blood pressure, and a respiratory rate of the first user.

9. A system for filtering media content to prevent sleep disturbances, comprising:
a memory having computer readable instructions; and
a processor for executing the computer readable instructions, the computer readable instructions including instructions for:
receiving from a first user a request for a content item;
obtaining a user profile for the first user and a description of the content item;
comparing the user profile to the description of the content item to identify characteristics of the content item that will be disturbing to the first user;
determining, based on the comparison, whether the content item will cause the first user to have a sleep disturbance;
based on determining that the content item will not cause the first user to have the sleep disturbance, playing the content item; and
based on determining that the content item will cause the first user to have the sleep disturbance, preventing the content item from being played.

10. The system of claim 9, wherein the computer readable instructions further include instructions for playing an alternate content item selected based on the description of the content item based on determining that the content item will cause the first user to have the sleep disturbance.

11. The system of claim 9, wherein the computer readable instructions further include instructions for playing a modified version of the content item, wherein the modified version of the content item has one or more portions of the content item removed based on determining that the content item will cause the first user to have the sleep disturbance.

12. The system of claim 9, wherein the user profile is created by:
identifying a consumed content item by the first user;
obtaining and storing sensor data regarding a state of the first user during consumption of the consumed content item;
detecting a change in the state of the first user;
determining a portion of the consumed content item that corresponds to the change;
identifying a characteristic of the portion of the consumed content item; and
storing the characteristic and the detected change in the user profile.

13. The system of claim 9, wherein determining whether the content item will cause the first user to have the sleep disturbance includes determining whether the content item includes characteristics that previously caused the first user to have the sleep disturbance.

14. The system of claim 12, wherein detecting the change in the state of the first user includes detecting a change in one or more of a heart rate, a blood pressure, and a respiratory rate of the first user.

15. The system of claim 12, wherein the user profile is updated by:
obtaining and storing sensor data regarding a sleeping state of the first user while the first user is sleeping after consuming the consumed content item;
detecting a disturbance in the sleeping state of the first user;
identifying a correlation between the disturbance in the sleeping state and the change in the state of the first user; and
updating the user profile to include the correlation.

16. The system of claim 15, wherein detecting the change in the sleeping state of the first user includes detecting a change in one or more of a heart rate, a blood pressure, and a respiratory rate of the first user.

17. A computer program product comprising a non-transitory computer readable storage medium having program instructions embodied therewith the program instructions executable by a computer processor to cause the computer processor to perform a method, comprising:
receiving from a first user a request for a content item;
obtaining a user profile for the first user and a description of the content item;
comparing the user profile to the description of the content item to identify characteristics of the content item that will be disturbing to the first user;
determining, based on the comparison, whether the content item will cause the first user to have a sleep disturbance;
based on determining that the content item will not cause the first user to have the sleep disturbance, playing the content item; and
based on determining that the content item will cause the first user to have the sleep disturbance, preventing the content item from being played.

18. The computer program product of claim 17, wherein the method further comprises, based on determining that the content item will cause the first user to have the sleep disturbance, playing an alternate content item selected based on the description of the content item.

19. The computer program product of claim 17, wherein the method further comprises, based on determining that the content item will cause the first user to have the sleep disturbance, playing a modified version of the content item, wherein the modified version of the content item has one or more portions of the content item removed.

20. The computer program product of claim 17, wherein the user profile is created by:
identifying a consumed content item by the first user;
obtaining and storing sensor data regarding a state of the first user during consumption of the consumed content item;
detecting a change in the state of the first user;
determining a portion of the consumed content item that corresponds to the change;
identifying a characteristic of the portion of the consumed content item; and
storing the characteristic and the detected change in the user profile.

* * * * *